United States Patent
Champagne et al.

(10) Patent No.: US 11,078,440 B2
(45) Date of Patent: Aug. 3, 2021

(54) METHOD FOR PROCESSING USED OILS

(71) Applicant: TOTAL MARKETING SERVICES, Puteaux (FR)

(72) Inventors: Nicolas Champagne, Caluire (FR); Dominique Blain, Fourqueux (FR)

(73) Assignee: TOTAL MARKETING SERVICES, Puteaux (FR)

( * ) Notice: Subject to any disclaimer, the term of this patent is extended or adjusted under 35 U.S.C. 154(b) by 0 days.

(21) Appl. No.: 16/470,007

(22) PCT Filed: Dec. 15, 2017

(86) PCT No.: PCT/EP2017/083155
§ 371 (c)(1),
(2) Date: Jun. 14, 2019

(87) PCT Pub. No.: WO2018/109208
PCT Pub. Date: Jun. 21, 2018

(65) Prior Publication Data
US 2020/0087595 A1    Mar. 19, 2020

(30) Foreign Application Priority Data

Dec. 16, 2016 (FR) ...................... 1662675

(51) Int. Cl.
*C10M 175/00* (2006.01)
*B01J 20/20* (2006.01)

(52) U.S. Cl.
CPC .......... *C10M 175/0008* (2013.01); *C10M 175/0033* (2013.01); *C10M 175/0058* (2013.01); *B01J 20/20* (2013.01); *C10M 2203/1045* (2013.01)

(58) Field of Classification Search
CPC .......... C10M 175/00; C10M 175/0008; C10M 175/0033; C10M 2203/1045; B01J 20/20
See application file for complete search history.

(56) References Cited

U.S. PATENT DOCUMENTS

| | | | |
|---|---|---|---|
| 4,977,871 A | 12/1990 | Brownawell et al. | |
| 5,225,081 A | 7/1993 | Brownawell | |
| 6,320,090 B1 | 11/2001 | Sherman et al. | |
| 7,459,079 B2 | 12/2008 | Selsdon | |
| 2009/0001023 A1* | 1/2009 | Dufresne | B01D 15/00 210/692 |
| 2009/0120842 A1 | 5/2009 | Koseoglu et al. | |
| 2011/0132819 A1* | 6/2011 | Kolstad | C10M 175/0016 210/97 |
| 2020/0102508 A1* | 4/2020 | Sivadasan | C10G 69/10 |

FOREIGN PATENT DOCUMENTS

CN    105524702    4/2016

OTHER PUBLICATIONS

International Search Report for PCT/EP2017/083155, dated Mar. 2, 2018.
Written Opinion of the International Searching Authority for PCT/EP2017/083155, dated Mar. 2, 2018.
Preliminary Search Report for FR 1662675, dated Jul. 31, 2017.
Cal gon: "Data Sheet Safety Mes sage",Dec. 31, 2015 (Dec. 31, 2015), XP055394853, Retrieved from the Internet: URL:http://www.calgoncarbon.com/wp-content /uploads/product-literature/Calgon-CarbonHPC-830-Series.pdf [retrieved on Jul. 31, 2017] the whole document.

* cited by examiner

*Primary Examiner* — Ellen M McAvoy
(74) *Attorney, Agent, or Firm* — B. Aaron Schulman, Esq.; Stites & Harbison, PLLC

(57) ABSTRACT

The invention relates to a method for lowering the content of polycyclic aromatic hydrocarbons (PAH) in a used lubricant composition, in which said used lubricant composition passes over activated carbon, said method not comprising a solvent extraction step.

10 Claims, No Drawings

METHOD FOR PROCESSING USED OILS

The present application relates to the processing of used lubricant compositions. The present application also concerns a method for preparing a regenerated lubricant composition able to be used as base oil, from a used lubricant composition.

Used lubricant compositions (or used oils) can be collected and then regenerated to be used as lubricant base.

Methods exist for processing these used lubricant compositions which, in particular, apply one or more distillations. However, the regenerated lubricant compositions thus obtained have a high content of polycyclic aromatic hydrocarbons (PAHs). PAHs are natural constituents of coal and petroleum, derived from incomplete combustion of organic matter such as fuels, or from oxidation of lubricant compositions. Recent studies have shown that these PAHs, and in particular Benzo[a]Pyrene (or BaP), have a potential impact on health. In particular, BaP is classified as a proven carcinogen, other PAHs being classified as probable carcinogens or possible carcinogens. The following PAHs are particularly considered to be harmful: chrysene, benzo[b]fluoranthene, benzo[j]fluoranthene, benzo[k]fluoranthene, benzo[e]pyrene, benzo[a]pyrene, dibenz[a,h]anthracene, and/or benz[a]anthracene.

It would therefore be advantageous to be able to reduce the quantity and even remove PAHs from regenerated lubricant compositions. Legal restrictions have also been introduced for some applications in which exposure is considered to be too high, this particularly concerning the field of metal working. For lubricant applications, recommendation R451 «Prevention of chemical risks caused by cutting fluids in metal machining operations» specifies that the concentration of BaP in the fluids must not exceed 100 μg/kg (100 ppb).

Solvent/solvent extraction methods exist which allow the PAH content in regenerated lubricant compositions to be lowered. However, this requires a complex industrial installation, thereby increasing production costs. In addition, the solvents used are generally N-Methyl-2-pyrrolidone or furfural which are reprotoxic and carcinogenic respectively. Also, these methods do not allow specific removal of BaP.

Catalytic methods are also available similar to those used for refining, to prepare Group II and III oils as defined by the API classification (or ATIEL classification equivalents). Although efficient, this method is most costly.

It would therefore be advantageous to provide a method for processing used lubricant compositions, which allows simple, hazard-free, economical lowering or removal of PAHs selected in particular from among chrysene, benzo[b]fluoranthene, benzo[j]fluoranthene, benzo[k]fluoranthene, benzo[e]pyrene, benzo[a]pyrene, dibenz[a,h]anthracene and/or benz[a]anthracene.

It is one objective of the present invention to provide a method for processing used lubricant compositions which allows the lowering and even removal of PAHs selected from among chrysene, benzo[b]fluoranthene, benzo[j]fluoranthene, benzo[k]fluoranthene, benzo[e]pyrene, benzo[a]pyrene, dibenz[a,h]anthracene and/or benz[a]anthracene, particularly BaP.

Another objective of the present invention is to provide said method that is easy to implement and economical.

A further objective of the invention is to provide said method that is hazard-free and does not use toxic products.

A further objective of the present invention is to provide a method for preparing a lubricant composition comprising less than 100 ppb of BaP, from used lubricant compositions.

Other objectives will become apparent on reading the following description of the invention.

These objectives are reached with the present invention which concerns a method for lowering the content of polycyclic aromatic hydrocarbons (PAHs) selected in particular from among chrysene, benzo[b]fluoranthene, benzo[j]fluoranthene, benzo[k]fluoranthene, benzo[e]pyrene, benzo[a]pyrene, dibenz[a,h]anthracene and/or benz[a]anthracene, from a used lubricant composition, comprising the passing of said used lubricant composition over activated carbon, said method not comprising a solvent extraction step.

By solvent extraction step is meant any liquid/liquid extraction step.

In the present invention, by «passing of the used lubricant composition over activated carbon» is also meant the flowing of the used lubricant composition over activated carbon.

In the present invention, by used lubricant composition is meant any lubricant composition that has been used to lubricate parts, mechanical parts in particular, and particularly engine parts and notably of motor vehicle engines. Having regard to their origin—engine lubrication—these used lubricant compositions have a high PAH content, particularly from among chrysene, benzo[b]fluoranthene, benzo[j]fluoranthene, benzo[k]fluoranthene, benzo[e]pyrene, benzo[a]pyrene, dibenz[a,h]anthracene and/or benz[a]anthracene, and BaP in particular. The used lubricant compositions applied in the invention can be any lubricant composition particularly comprising base oils selected from among oils of mineral or synthetic origin, selected from among Group 1 to V class oils as classified by the API classification (or ATIEL classification equivalents) (Table A), alone or in mixtures.

TABLE A

| | Saturates content | Sulfur content | Viscosity Index VI |
|---|---|---|---|
| Group I Mineral oils | <90% | >0.03% | 80 ≤ VI < 120 |
| Group II Hydrocracked oils | ≥90% | ≤0.03% | 80 ≤ VI < 120 |
| Group III Hydrocracked or hydro-isomerized oils | ≥90% | ≤0.03% | ≥120 |
| Group IV | Polyalphaolefins (PAOs) | | |
| Group V | Esters and other bases not included in Groups I to IV | | |

These used lubricant compositions may also comprise any type of additive generally used in lubricant compositions e.g. detergents, anti-wear additives, extreme-pressure additives, viscosity index improvers, dispersants, antioxidants, pour point depressants, defoamers, friction modifiers and mixtures thereof.

Preferably, in the method of the invention, the amount of activated carbon used is between 0.5 and 60 g of activated carbon per litre of used lubricant composition, preferably between 0.5 and 50 g/l, preferably from 1 to 50 g/l, preferably between 1 and 30 g/l, e.g. between 5 and 60 g/l, preferably between 5 and 50 g/l.

The pass rate of the used lubricant composition can be between 1 m³/h and 15 m³/h, e.g. between 5 and 10 m³/h.

Preferably, in the method of the invention, the activated carbon is characterized by a density of between 200 and 500 kg/m³, measured for example in accordance with standard ASTDM D2854.

Preferably, the activated carbon is coal carbon preferably comprising from 70 to 95%, advantageously from 80 to 90% of carbon by weight.

Advantageously, the method of the invention may comprise a prior step to filter the used lubricant composition. This filtration can be conducted using any method known to persons skilled in the art. This filtering step may or may not be a particulate filtration step. For example, it can be performed using systems of diatomaceous earth type. In particularly advantageous manner, this step allows extended activity of the activated carbon by increasing its lifetime and hence the time between two renewals or two reactivations of the activated carbon. Reactivation of the activated carbon can be carried out using any method known to skilled persons to regenerate the activated carbon e.g. by high temperature treatment for example at 800° C. or higher. This prior filtration step allows an extended time period over which the passing of the used oil over the activated carbon is efficient in terms of lowering of PAH content, preferably of BaP.

The method of the invention may advantageously comprise one or more prior distillation steps of the used lubricant composition. These distillation steps can be carried out using any technique known to skilled persons. Advantageously, the method of the invention may comprise a distillation step to remove water, followed by a distillation step to remove diesel and finally a distillation step under reduced pressure. For example, the distillations can be conducted at a temperature of between 100 and 400° C., and at a pressure of between 50 and 2000 Pa.

The method of the invention may advantageously comprise the following prior steps:
 one or more distillation steps; and
 a filtering step.
These steps are such as defined above.

Advantageously the method of the invention allows significant lowering of the PAH content of the regenerated lubricant composition. Advantageously, with the method of the invention it is possible to obtain a regenerated lubricant composition comprising less than 100 ppb of each of the following PAHs: chrysene, benzo[b]fluoranthene, benzo[j]fluoranthene, benzo[k]fluoranthene, benzo[e]pyrene, benzo[a]pyrene, dibenz[a,h]anthracene, benz[a]anthracene . The content of these PAHs being determined according to standard EN 16143.

Preferably the PAH is benzo[a]pyrene (BaP). Advantageously the method of the invention allows significant lowering of the BaP content in the regenerated lubricant composition.

Advantageously, with the method of the invention it is possible to obtain a regenerated lubricant composition comprising less than 100 ppb of BaP.

The present invention also concerns a method for preparing a lubricant composition comprising less than 100 ppb of each of the following PAHs: chrysene, benzo[b]fluoranthene, benzo[j]fluoranthene, benzo[k]fluoranthene, benzo[e]pyrene, benzo[a]pyrene, dibenz[a,h]anthracene, benz[a]anthracene, preferably less than 100 ppb of BaP, from a used lubricant composition, comprising the passing of said used lubricant composition over activated carbon.

Preferably, in the method of the invention, the amount of activated charcoal used is between 0.5 and 60 g of activated carbon per litre of used lubricant composition, preferably between 0.5 and 50 g/l, preferably from 1 to 50 g/l, preferably between 1 and 30 g/l, e.g. between 5 and 60 g/l, preferably between 5 and 50 g/l.

The method of the invention may advantageously comprise a prior step to filter the used lubricant composition such as defined above.

The method of the invention may advantageously comprise one or more prior distillation steps of the used lubricant composition such as defined above.

The method of the invention may advantageously comprise the following prior steps:
 one or more distillation steps; and
 a filtering step.
These steps are such as defined above.

The present application will now be described with the aid of nonlimiting examples. The characteristics of a reference used lubricant composition (Ref. Composition), subjected to a prior distillation and filtration, are given in the Table below.

|  | Standard used for determination of characteristics | Reference composition |
|---|---|---|
| Colour | NF ISO 2049 | L4.5 |
| Viscosity at 100° C. (mm$^2$/s) | NF EN ISO 3104 | 5.28 |
| Viscosity at 40° C. (mm$^2$/s) | NF EN ISO 3104 | 28.8 |
| Viscosity Index | NF ISO 2909 | 117 |
| Pour point in 3 bases (° C.) | ISO 3016 | −12 |
| CCS at −20° C. (mPa · s) | ASTM D 5293 | 1270 |
| CCS at −25° C. (mPa · s) |  | 2326 |
| Refractive Index at 20° C. | ASTM D 1747 | 1.4707 |
| Density at 15° C. (kg/m3) | NF EN ISO 12185 | 854.9 |
| Deaeration (50° C.) | NF ISO 9120 | 6.6 min |
| Cleveland flash point (° C.) | NF EN ISO 2592 | 234 |
| Noack volatility (% m), procedure B | CEC-L-40-A93 | 9.80% |
| Sulfur content | ASTM D 2622 | 0.22% |
| Simulated TBP Cut points T95-T5 (° C.) | IP480 | 178 |

This reference composition was treated with the method of the invention and passed over different activated carbons; the resulting compositions (compositions 1 to 8) were analysed to determine the PAH composition thereof on the basis of standard NF EN 16143.

|  | Ref. Composition | Composition 1 | Composition 2 | Composition 3 | Composition 4 | Composition 5 | Composition 6 | Composition 7 | Composition 8 |
|---|---|---|---|---|---|---|---|---|---|
|  |  | Activated carbon: HPC-MAXX 830 ® from Chemviron Carbon ||||| Activated carbon: CPG LF ® from Chemviron Carbon |||
| quantity of activated carbon (g/l of composition) | 0 | 1 | 5 | 10 | 30 | 50 | 10 | 30 | 50 |

|  |  | Ref. Composition | Activated carbon: HPC-MAXX 830 ® from Chemviron Carbon | | | | | Activated carbon: CPG LF ® from Chemviron Carbon | | |
|---|---|---|---|---|---|---|---|---|---|---|
|  |  |  | Composition 1 | Composition 2 | Composition 3 | Composition 4 | Composition 5 | Composition 6 | Composition 7 | Composition 8 |
| Benz[a]anthracene | mg/kg | 3.4 | 2.6 | 0.8 | 0.3 | <0.1 | <0.1 | 0.3 | <0.1 | <0.1 |
| Chrysene | mg/kg | 2.7 | 2.1 | 0.6 | 0.2 | <0.1 | <0.1 | 0.2 | <0.1 | <0.1 |
| Benzo[b]fluoranthene | mg/kg | 4.3 | 3 | 0.6 | 0.2 | <0.1 | <0.1 | 0.2 | <0.1 | <0.1 |
| Benzo[j]fluoranthene | mg/kg | 0.9 | 0.6 | <0.1 | <0.1 | <0.1 | <0.1 | <0.1 | <0.1 | <0.1 |
| Benzo[k]fluoranthene | mg/kg | 1.1 | 0.8 | 0.2 | <0.1 | <0.1 | <0.1 | <0.1 | <0.1 | <0.1 |
| Benzo[e] pyrene | mg/kg | 5.2 | 3.7 | 0.8 | 0.3 | <0.1 | <0.1 | 0.3 | <0.1 | <0.1 |
| Benzo[a] pyrene | mg/kg | 4.3 | 2.7 | 0.4 | 0.1 | <0.1 | <0.1 | 0.1 | <0.1 | <0.1 |
| Dibenz[a,h] anthracene | mg/kg | 0.5 | 0.4 | <0.1 | <0.1 | <0.1 | <0.1 | <0.1 | <0.1 | <0.1 |
| Total PAH | mg/kg | 22.5 | 15.9 | 3.4 | 1 | 0 | 0 | 1 | 0 | 0 |

These results show that the method of the invention advantageously allows lowering of the quantity of PAHs in used lubricant compositions, and in particular lowering of BaP.

Additionally, with the method of the invention it is possible to improve the colour of the resulting lubricant compositions, as shown in the Table below.

|  | Colour ASTM D1500 |
|---|---|
| Reference composition | 4.5 |
| Composition 1 | 3.9 |
| Composition 2 | 3.6 |
| Composition 3 | 3.4 |
| Composition 4 | 3.2 |
| Composition 5 | 3.1 |
| Composition 6 | 3.3 |
| Composition 7 | 3.3 |
| Composition 8 | 3.2 |

The invention claimed is:

1. A method for lowering the content of polycyclic aromatic hydrocarbons (PAHs) in a used lubricant composition, comprising the passing of said used lubricant composition over activated carbon, said method not comprising a solvent extraction, the quantity of activated carbon applied being between 0.5 and 60 g per litre of lubricant composition, wherein the method further comprises prior distillation of the used lubricant composition.

2. The method according to claim 1, wherein the quantity of activated carbon used is between 1 and 50 g per litre of lubricant composition.

3. The method according to claim 1, wherein the activated carbon is characterized by a density of between 200 and 500 kg/m$^3$.

4. The method according to claim 1, further comprising prior filtering of the used lubricant composition.

5. The method according to claim 1, wherein the PAH is benzo-a-pyrene.

6. The method according to claim 1, further comprising before the passing of said used lubricant composition over activated carbon:

one or more distillations; and filtering.

7. A method for preparing a lubricant composition comprising less than 100 ppb of each of the following PAHs: chrysene, benzo[b]fluoranthene, benzo[j]fluoranthene, benzo[k]fluoranthene, benzo[e]pyrene, benzo[a ]pyrene, dibenz[a,h]anthracene, benz[a ]anthracene, from a used lubricant composition, comprising the passing of said used lubricant composition over activated carbon.

8. The method according to claim 7, wherein the PAH is benzo-a-pyrene.

9. The method according to claim 7, further comprising prior filtering of the used lubricant composition.

10. The method according to claim 7, further comprising before the passing of said used lubricant composition over activated carbon:

one or more distillation stepsdistillations; and filtering.

* * * * *